(12) United States Patent
Lin et al.

(10) Patent No.: US 7,363,135 B2
(45) Date of Patent: Apr. 22, 2008

(54) STEERING HAPTIC FEEDBACK SYSTEM FOR VEHICLE ACTIVE SAFETY

(75) Inventors: William C. Lin, Troy, MI (US); Yuen-Kwok Chin, Troy, MI (US); David M. Sidlosky, Beverly Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/475,690

(22) Filed: Jun. 27, 2006

(65) Prior Publication Data

US 2007/0299580 A1    Dec. 27, 2007

(51) Int. Cl.
*A01B 69/00*    (2006.01)
(52) U.S. Cl. .......................................... 701/42; 701/41
(58) Field of Classification Search .................. 701/41, 701/42; 180/410, 282; 188/350; 116/31
See application file for complete search history.

(56) References Cited

U.S. PATENT DOCUMENTS

| | | | |
|---|---|---|---|
| 5,746,486 A | | 5/1998 | Paul et al. |
| 7,034,698 B2 * | | 4/2006 | Matsumoto et al. ........ 340/575 |
| 2004/0252020 A1 * | | 12/2004 | Matsumoto et al. ........ 340/438 |
| 2005/0161279 A1 * | | 7/2005 | Kato et al. .................. 180/443 |
| 2006/0061464 A1 * | | 3/2006 | Okada et al. ............... 340/459 |
| 2006/0119474 A1 * | | 6/2006 | Requejo et al. ............. 340/438 |

\* cited by examiner

*Primary Examiner*—Mark Hellner (57) ABSTRACT

A system and method that warn a vehicle driver by shaking or dithering the steering wheel that one or more active control systems on the vehicle is providing active control. The system includes an AFS actuator for providing a steering assist signal for stability control purposes, and a VES actuator for providing resistance against turning of the steering wheel. The system also includes a controller for causing the AFS actuator to shake the steering wheel if the active control is active and for causing the VES controller to apply and release tension to the steering wheel if the steering wheel is turned and the active control is active. The controller may increase the shaking of the steering wheel as the amount of the active control increases.

24 Claims, 8 Drawing Sheets

STEERING HAPTIC FEEDBACK SYSTEM FOR VEHICLE ACTIVE SAFETY

BACKGROUND OF THE INVENTION

1. Field of the Invention

This invention relates generally to a system and method for warning the driver of a vehicle that an active control system on the vehicle is taking action and, more particularly, to a system and method for warning a driver of a vehicle that an active control system on the vehicle is taking action, or other driver alertness condition needs to be brought to the drivers attention, that includes dithering the steering wheel of the vehicle.

2. Discussion of the Related Art

Modern vehicles sometimes incorporate active vehicle control systems. One such system is known as a vehicle stability enhancement (VSE) system that assists the vehicle operator in providing vehicle handling on surfaces such as wet or uneven pavement, ice, snow or gravel. The VSE system typically senses wheel skid based on inputs from a wheel speed sensor, a steering angle sensor, a vehicle speed sensor and a vehicle yaw rate sensor. The VSE system uses these inputs to reduce engine torque and apply differential braking to help maintain the vehicle travel along the intended path.

Additionally, active chassis control systems have been emerging in the art that are used in combination with VSE systems. The chassis control systems typically include differential braking control, real-time suspension damping, automatic rear-wheel steering and active front steering control. With the capability of controlling chassis dynamics in real time, the active chassis control systems can be used to enhance the vehicle handling performance.

Another active vehicle control system is known as an active front steering (AFS) system that provides automatic front-wheel steering. AFS systems typically employ a steering actuator system that receives a steering signal from a hand-wheel angle sensor, a vehicle speed signal and a vehicle yaw rate signal, and provides a correction to the operator steering signal to cause the vehicle to more closely follow the vehicle operator's intended steering path to increase vehicle stability and handling. The AFS system is able to provide steering corrections much quicker than the vehicle operator's reaction time, so that the amount of operator steering is reduced. The AFS system provides a more direct vehicle steering under normal road conditions at low and medium speeds, reducing operator steering effort. The AFS system also may help to increase vehicle agility in city traffic or during parking maneuvers. The AFS system also provides less direct vehicle steering at higher vehicle speeds.

The stability control systems discussed above may provide vehicle stability control in response to driver aggressiveness and/or road conditions when needed. Because the stability control system typically controls the vehicle in the way the driver intends, the driver may not be aware that the control system is actively providing stability control. Therefore, the driver may not take appropriate action or care, such as reducing driving aggressiveness, in response to the stability control action. Thus, it would be desirable to provide some type of indication or warning to the driver that the stability control system was active.

SUMMARY OF THE INVENTION

In accordance with the teachings of the present invention, a system and method are disclosed that warn a vehicle driver by shaking or dithering the steering wheel that one or more active control systems on the vehicle is providing active control or a driver alertness condition exists. The system includes an active front steering (AFS) actuator for providing a steering assist signal for stability control purposes, and a variable effort steering (VES) actuator for providing steering torque control, including torque assist, and resistance against turning of the steering wheel depending on the driving situation and the desired steering control. The system also includes a controller for causing the AFS actuator to shake the steering wheel if the active control is active and for causing the VES controller to apply and release tension to the steering wheel if the steering wheel is turned and the active control is active. The controller may increase the shaking of the steering wheel as the amount of the active control increases.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for warning a vehicle driver that an active stability control system is providing active control is merely exemplary in nature, and is in no way intended to limit the invention or its applications or uses.

Figure 1:
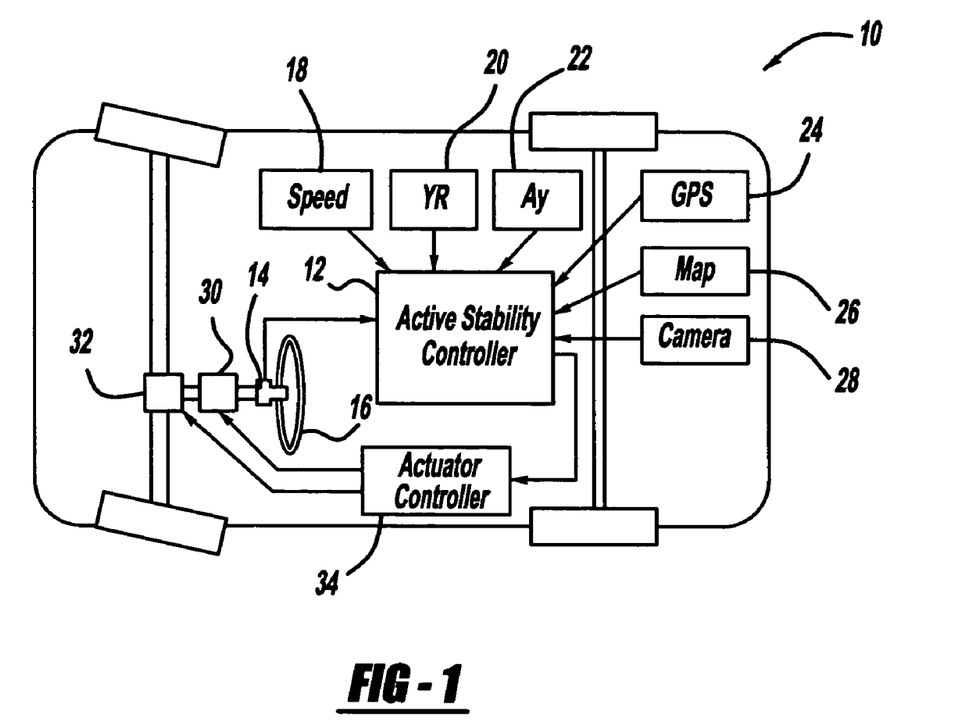
FIG. 1 is a schematic diagram of a vehicle equipped with a variable effort steering (VES) system, an active front steering (AFS) system and active stability control.

FIG. 1 is a plan view of a vehicle 10 including a vehicle active stability controller 12. The vehicle 10 also includes a hand-wheel angle sensor 14 that provides a signal to the controller 12 of the position of a vehicle hand-wheel 16. The vehicle 10 also includes a vehicle speed sensor 18, a vehicle yaw rate sensor 20 and a vehicle lateral acceleration sensor 22 that provide a vehicle speed signal, a vehicle yaw rate signal and a vehicle lateral acceleration signal or side-slip velocity signal, respectively, to the controller 12. Further, the vehicle 10 includes a GPS receiver 24 that provides a signal to the controller 12 of the position of the vehicle 10 and a map database 26 that provides a map of the roads. Also, a camera 28 can be employed to view the road and/or the driver's facial features for vehicle path recognition or driver drowsiness detection.

The controller 12 can be one or more of the existing or future active vehicle control systems, or combinations thereof, for the purpose of providing vehicle stability control and safety enhancement. Examples of vehicle stability control systems include vehicle stability enhancement systems to provide a more responsive vehicle performance under limit-handling conditions, such as differential brake control, active front steer control or active rear wheel steering control. Other examples include active front steering control systems, lane departure control and curb speed control under normal driving conditions, and state-of-the-art driver attention detection and controls.

In any of these types of active vehicle control, for example, stability control systems, the control system typically monitors the vehicle's intended performance and compares it with actual measurements of the vehicle dynamics using one or more of the sensors discussed above. When a discrepancy is detected between the intended performance and the actual performance, an error index is generated to determine whether a control action is necessary. For example, a yaw-rate error can be used as an error index to determine whether the vehicle is at a critical condition during a limit-handling operation on a slippery surface when the vehicle fails to follow the driver's intended yaw-rate command as determined by the hand-wheel angle signal and the vehicle speed signal. Another example is vehicle path error recognition during normal driving conditions where the vehicle may start deviating from the intended path, for example, when the driver is not paying proper attention to the driving conditions as a result of alertness, drowsiness, etc. A path error can be determined from any of several devices, such as, lane-watching cameras, map information as compared with the vehicle position provided by the GPS receiver 24, etc. In any of these conditions, whether limit-handling or normal driving conditions, the controller 12 is designed to provide corrective actions to maximize vehicle safety operation.

Some vehicle designs are equipped with an AFS actuator 30 and/or a VES actuator 32. The controller 12 may provide steering commands to the actuators 30 and 32 through an actuator controller 34 in response to the error signals, as discussed above. The AFS actuator 30 provides additional steering to the vehicle 10 in addition to what the driver is commanding through the hand-wheel 16. The VES actuator 32 changes the amount of steering torque assist through the adjustment of the hydraulic power resistance, or through electric power steering, provided to the hand-wheel when the driver is turning. Particularly, the VES actuator 32 provides a degree of steering effort to the driver depending on the type of vehicle. For example, a luxury vehicle may have a light steering resistance and a high performance vehicle may have a hard steering resistance. Thus, the VES actuator 32 allows different steering resistances for different types of vehicles without the need to change various components, such as torsion bars, hydraulic valves, etc.

According to the invention, the controller 12 and the controller 34 are modified to also provide an AFS dither angle (DA) command and/or a VES dither current (DC) command to the actuators 30 and 32, respectively, to warn the driver that a stability control action is being performed.

Figure 2:
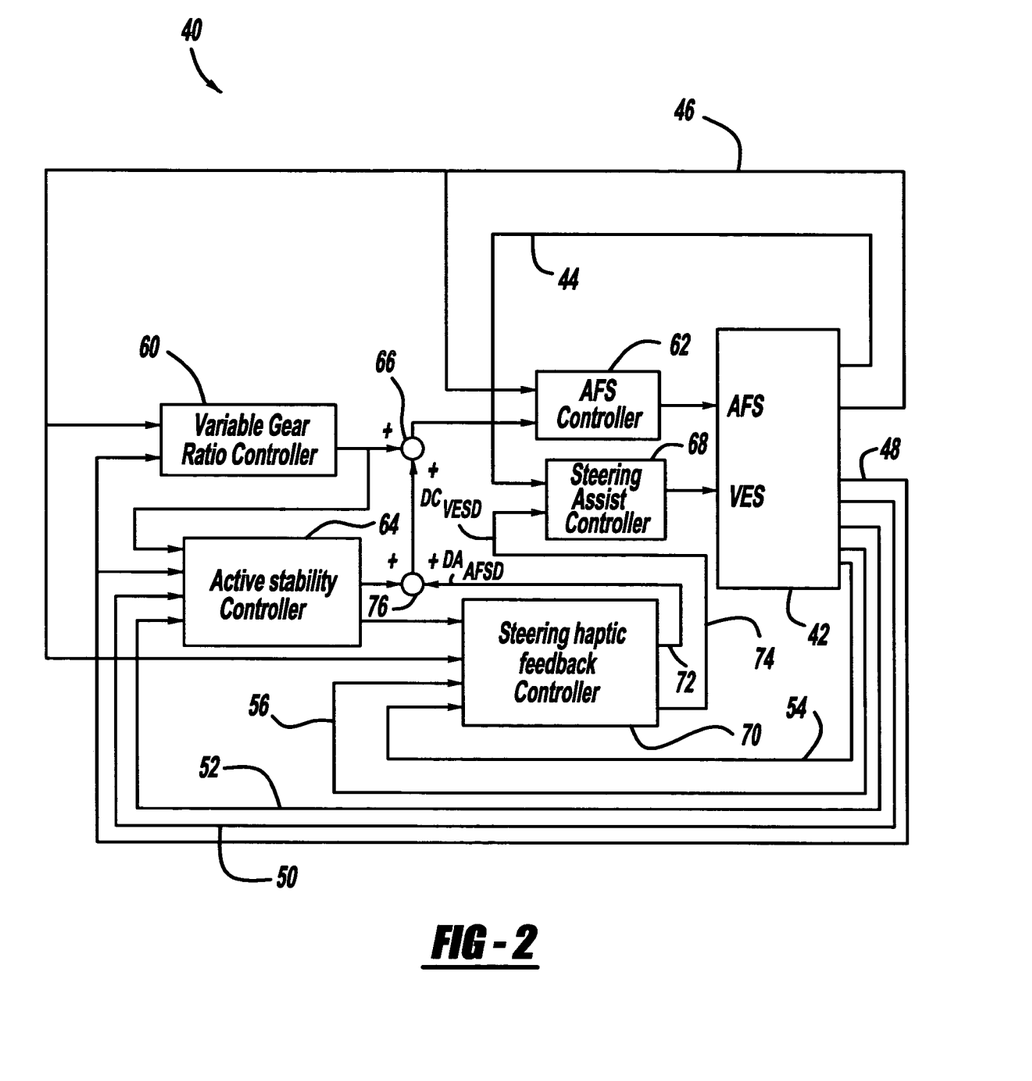
FIG. 2 is a schematic block diagram of an active vehicle control system for warning the vehicle driver that stability control is being provided, according to an embodiment of the present invention.

FIG. 2 is a block diagram of a system 40 that provides the AFS dither angle command and the VES dither command during stability control actions, according to an embodiment of the present invention. In the system 40, box 42 represents the vehicle 10. From the vehicle 42, a hand-wheel torque signal and a hand-wheel angle signal are provided on lines 44 and 46, respectively, from the hand-wheel angle sensor 14. Further, the vehicle speed signal from the speed sensor 18 is provided on line 48, the yaw rate signal from the yaw rate sensor 20 is provided on line 50, the lateral acceleration signal from the lateral acceleration sensor 22 is provided on line 52, the GPS signal from the GPS receiver 24 is provided on line 54 and the map information from the map database 26 is provided on line 56. The hand-wheel angle signal is provided to a variable gear ratio controller 60 that determines how much additional steering will be provided by the AFS actuator 30 to enhance the driver steering by any suitable technique known to those skilled in the art.

A steering angle signal from the controller 60 will be added to the hand-wheel angle signal in an AFS controller 62 to provide the front-wheel steering angle signal to the AFS actuator 30 on the vehicle 42. The system 40 also includes an active stability controller 64, representing the stability controller 12, that receives the steering angle signal from the controller 60, the vehicle speed signal, the yaw rate signal and the lateral acceleration signal, and provides an active steering signal that is added to the steering angle signal from the controller 60 by an adder 66 to provide active steering control, if necessary. Particularly, the controller 64 determines whether the vehicle 42 is following the driver's intended steering path, and if not, provides steering assistance control. The hand-wheel torque signal is applied to a steering assist controller 68 that provides an output to the VES actuator 32 on the vehicle 42 to provide the desired level of steering resistance depending on the particular vehicle.

According to the invention, the control system 40 includes a steering haptic feedback controller 70 that provides a dither angle ($DA_{AFSD}$) command signal on line 72 and a dither current ($DC_{VESD}$) command signal on line 74, according to an embodiment of the present invention. As will be discussed in detail below, the $DA_{AFSD}$ signal is added to the steering signal from the controller 64 by an adder 76 that causes the hand-wheel 16 to vibrate when the AFS controller 62 is providing the steering angle signal for stability control. Likewise, the $DC_{VESD}$ signal is sent to the steering assist controller 68 that causes the tension applied to the hand-wheel 16 provided and released to vibrate if steering control is being provided when the hand-wheel 16 is turned.

Figure 3:
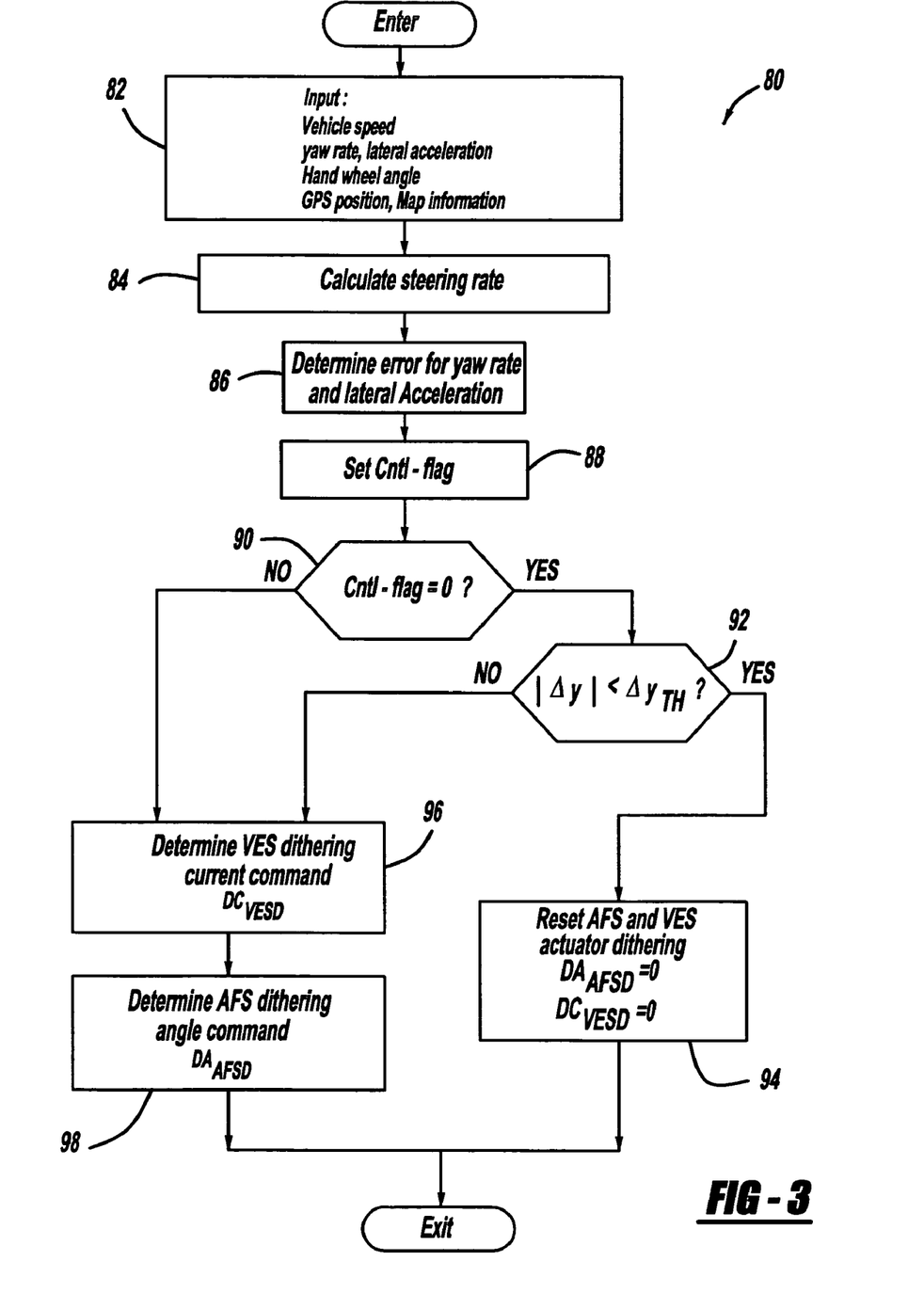
FIG. 3 is a flow chart diagram showing a process for providing the warning of active stability control, according to an embodiment of the present invention.

FIG. 3 is a flow chart diagram 80 showing a process for dithering the hand-wheel 16 during a stability control action, according to an embodiment of the invention. The algorithm reads the vehicle speed signal, the yaw rate signal, the lateral acceleration signal, the hand-wheel angle signal, the GPS position signal and map information at box 82. The algorithm then calculates the steering rate based on the input signals in the active stability controller 64 at box 84 by any know process. The algorithm then determines an error signal between the intended vehicle yaw rate and the actual vehicle yaw rate and an error signal between the desirable lateral acceleration and the actual lateral acceleration in the controller 64 at box 86. If the difference between the intended vehicle yaw rate and the actual vehicle yaw rate is greater than some predetermined threshold, then the algorithm sets a control flag to one at box 88, otherwise the control flag is zero. Any suitable control algorithm can be used to set the control flag, such as the algorithm disclosed in U.S. Pat. No. 5,746,486 issued May 5, 1998 to Paul et al., titled Brake Control System, assigned to the Assignee of this application, and herein incorporated by reference. Alternately, the algorithm can set the control flag from active safety controls, as would be well understood to those skilled in the art.

The algorithm then determines whether the control flag is zero at decision diamond 90. If the control flag is zero at the decision diamond 90, meaning that the intended vehicle yaw rate and the actual vehicle yaw rate are about the same, then the algorithm determines whether the absolute value of the lateral acceleration error signal $\Delta y$ is less than a predetermined threshold $\Delta y_{TH}$ at decision diamond 92. If the lateral acceleration error signal $\Delta y$ is less than the threshold $\Delta y_{TH}$ at decision diamond 92, then there is no active control needed or being provided, and thus the algorithm sets the $DA_{AFSD}$ command signal and the $DC_{VESD}$ command signal to zero at the output of the controller 70 at box 94.

If, however, the control flag is set to one at the decision diamond 90 or the lateral acceleration error signal $\Delta y$ is greater than the threshold $\Delta y_{TH}$ at the decision diamond 92, then the algorithm will determine the VES dither current $DC_{VESD}$ command signal at box 96 and the AFS dither angle $DA_{AFSD}$ command signal at box 98 to provide the hand-wheel dithering to warn the driver of active stability control.

Figure 4:
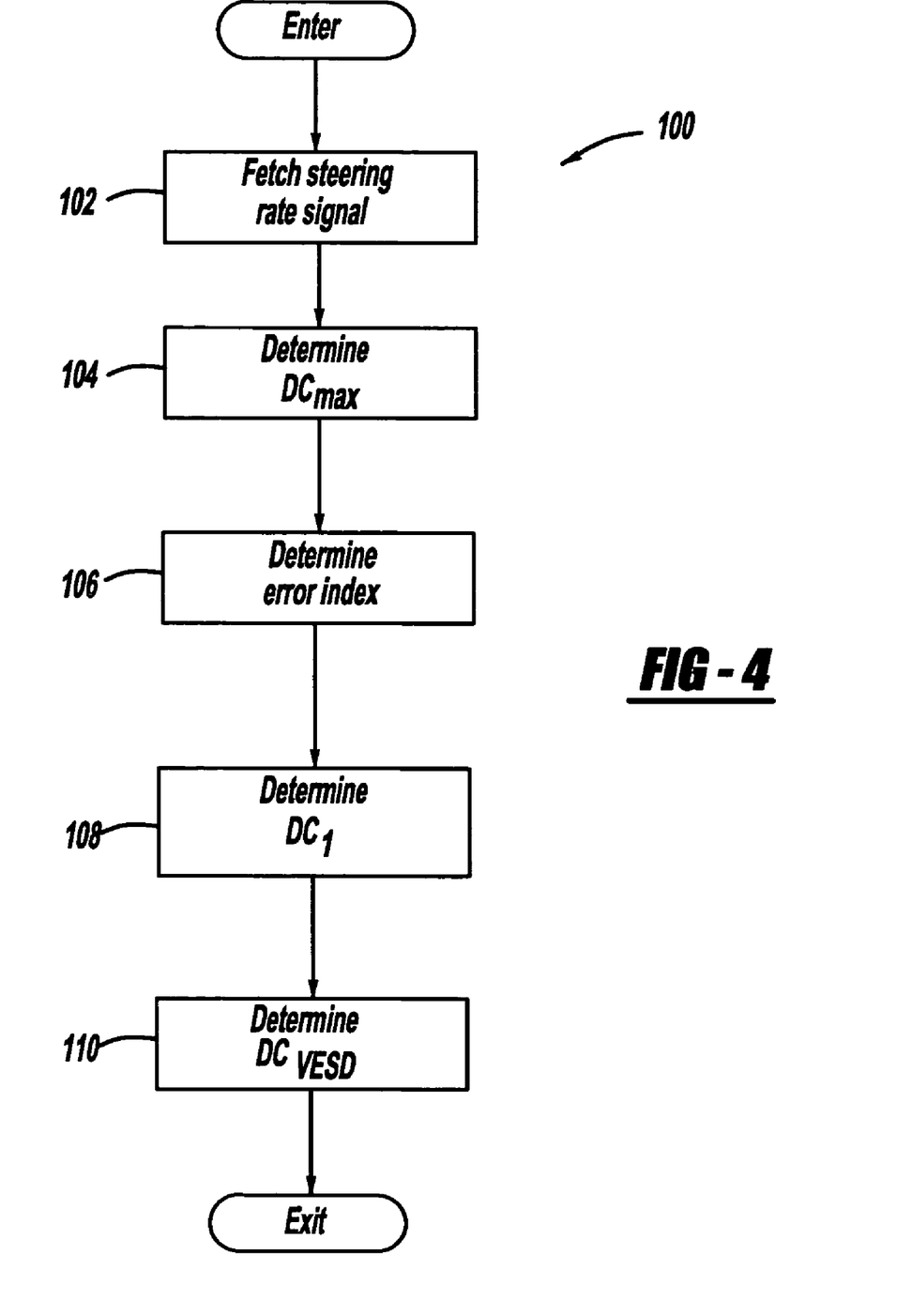
FIG. 4 is a flow chart diagram showing the process for determining a VES dithering current (DC) command in the flow chart diagram shown in FIG. 3.
Figure 5:
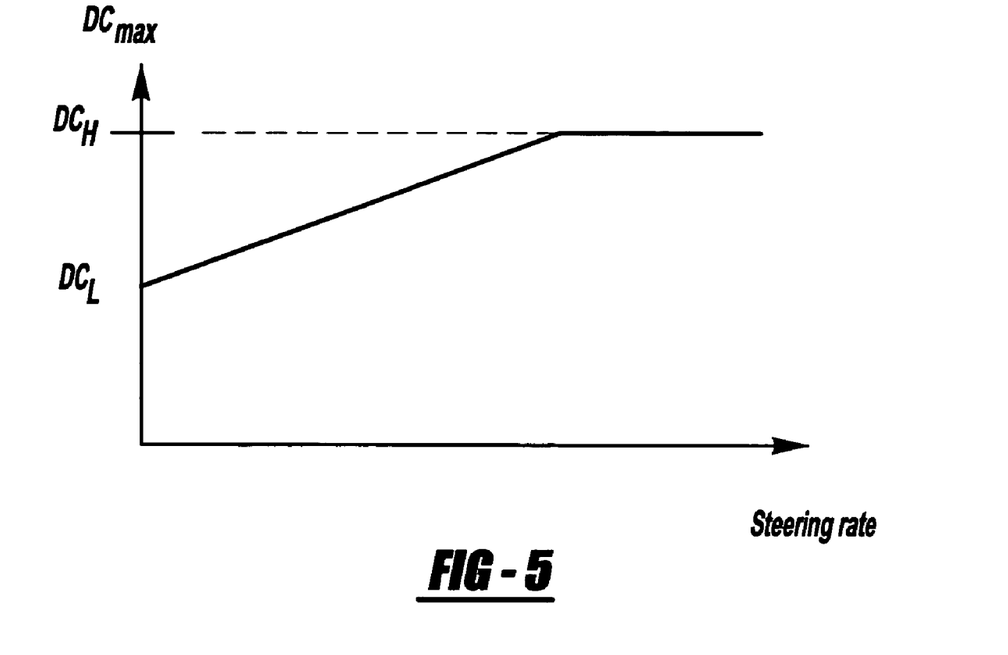
FIG. 5 is a graph with steering rate on the horizontal axis and maximum DC command on the vertical axis for determining a maximum DC command based on steering rate.

FIG. 4 is a flow chart diagram 100 showing the process of determining the VES dither current $DC_{VESD}$ command signal at the box 96, according to an embodiment of the present invention. At box 102, the algorithm fetches the steering rate signal determined at the box 84. The algorithm then determines a maximum VES dither current $DC_{MAX}$ command at box 104 based on the steering rate signal. FIG. 5 is a graph with the steering rate on the horizontal axis and maximum $DC_{MAX}$ command on the vertical axis showing that the maximum $DC_{MAX}$ command increases as the steering rate signal increases up to a certain point. Particularly, if the steering rate is small, the maximum amount of dither of the hand-wheel 16 would also be relatively small so that the amount of vibration of the hand-wheel 16 is proportionate to the amount of stability control being provided. The maximum $DC_{MAX}$ command will be between a low $DC_L$ command and a high $DC_H$ command.

The algorithm then determines an error index signal at box 106 that represents the difference between the intended vehicle yaw rate and the actual vehicle yaw rate or the desired lateral acceleration and the actual lateral acceleration. In one embodiment, the error index signal is a weighted sum of the yaw rate error, the vehicle path error and its derivative as:

$$\text{ErrorIndex}=Cr^*\text{abs}(\Delta r+Kr^*d(\Delta r)/dt)+Cy^*\text{abs}(\Delta y+Ky^*d(\Delta y)/dt) \quad (1)$$

The yaw rate error index is assessed based on a weighted sum of the yaw rate error and its time derivative with a weighting factor Kr. The weighting factor Kr reflects the vehicle dynamic response to provide a better anticipation of the vehicle yaw rate error. For example, for vehicles having slower yaw rate responses, such as vehicles with a longer wheel base, the weighting factor Kr would be smaller, for example, 0.2. Alternately, for sporty vehicles, the weighting factor Kr would typically be larger, for example, 0.5. The vehicle path error is also determined in a similar manner, where the weighting factor Ky for the lateral acceleration error is chosen in a similar way. The vehicle error index is then defined by a weighted sum of these two error indices. The weighting factors Cr and Cy are determined to reach approximately equal contributions from the yaw rate error index and the path error index according to the respective engineering units of the vehicle dynamics.

Figure 6:
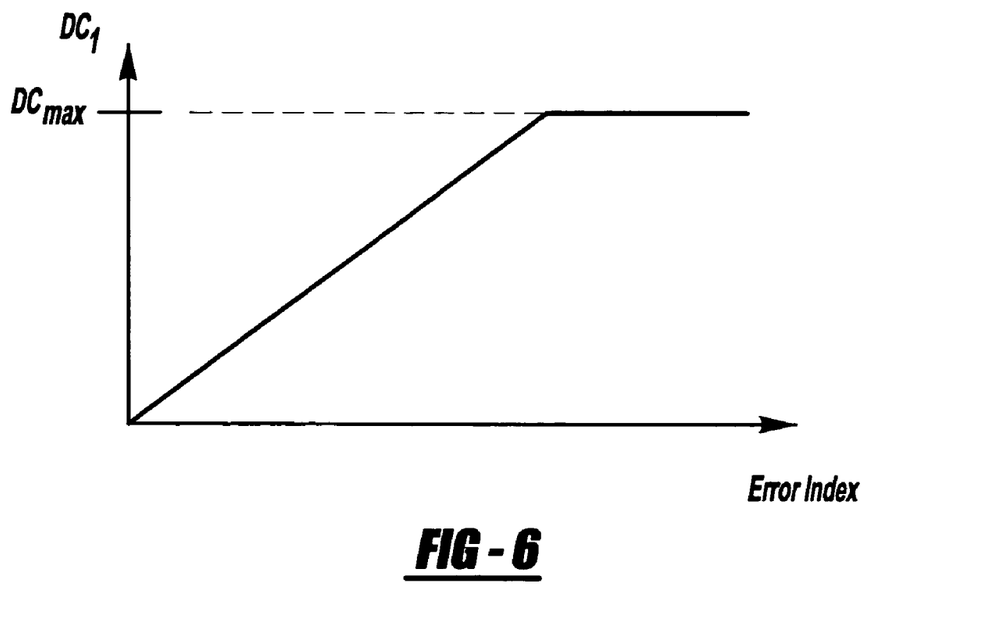
FIG. 6 is a graph with error index on the horizontal axis and DC command on the vertical axis for determining a DC command based on the error index.

The algorithm then determines a $DC_1$ command based on the error index at box 108. FIG. 6 is a graph with error index on the horizontal axis and the $DC_1$ command on the vertical axis. The calculation for the maximum $DC_{MAX}$ command as discussed above will determine how high the $DC_1$ command will be. For low error indexes, the $DC_1$ command will be a proportional amount of the maximum $DC_{MAX}$ command so that the amount of dithering is again proportionate to the amount of stability control being provided.

Figure 7:
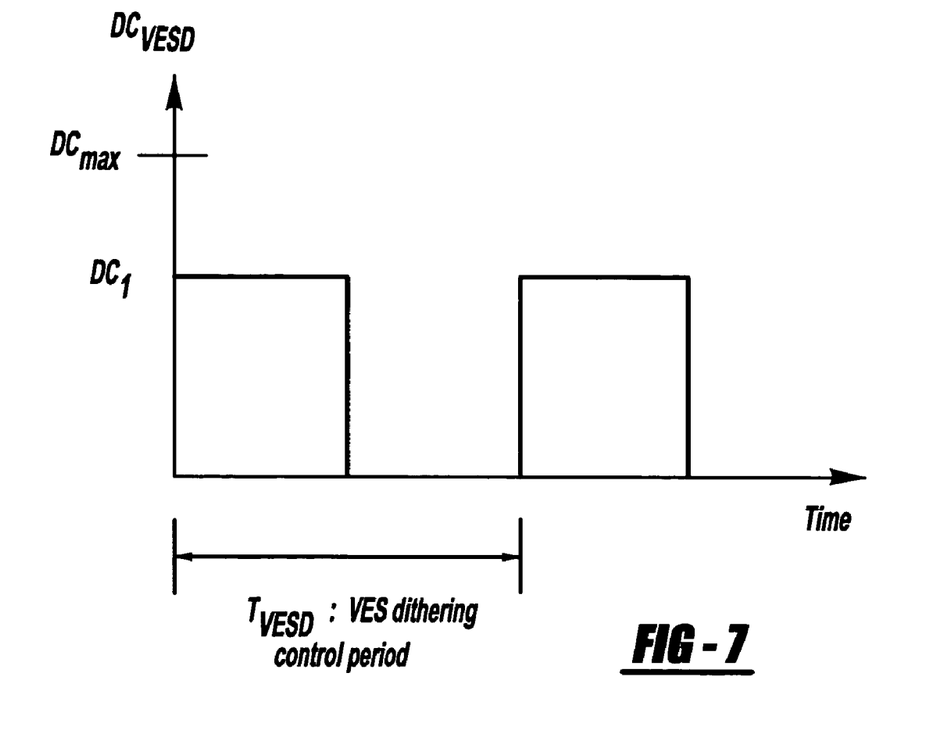
FIG. 7 is a graph with time on the horizontal axis and DC dithering command on the vertical axis showing the VES dithering control signal.

The $DC_1$ command is a current amplitude value that is used to determine the vibrational intensity of the VES dithering. FIG. 7 is a graph with time on the horizontal axis and the $DC_1$ command on the vertical axis showing that the $DC_1$ command is a proportion of the $DC_{MAX}$ command. The $DC_{VESD}$ command is determined at box 110, and is set by the amplitude of the $DC_1$ command and the VES dithering control period. The amplitude of the $DC_1$ command provides an increase in the resistance applied to the hand-wheel 16.

Figure 8:
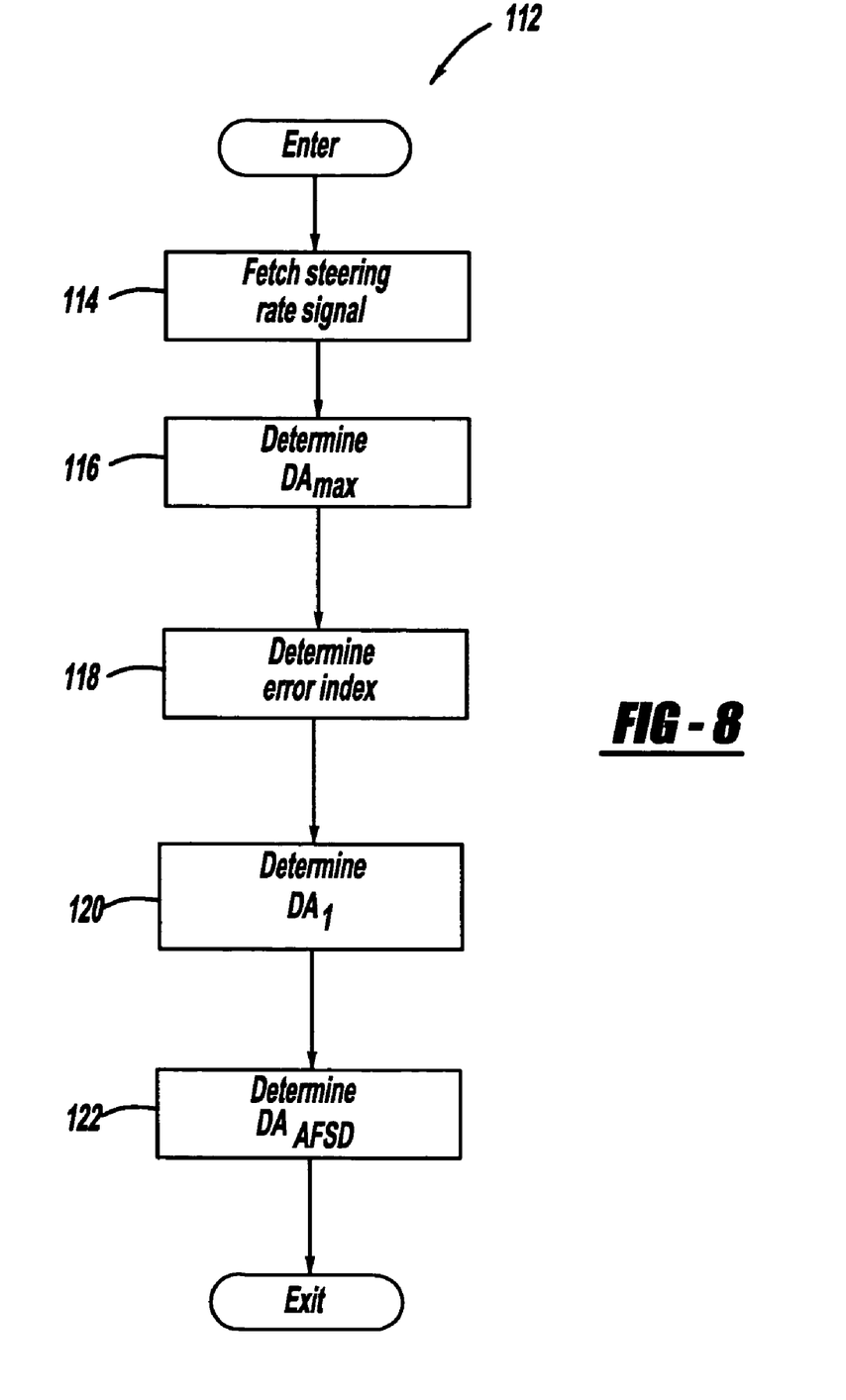
FIG. 8 is a flow chart diagram showing the process for determining an AFS dithering angle (DA) command in the flow chart diagram of FIG. 3, according to the invention.
Figure 9:
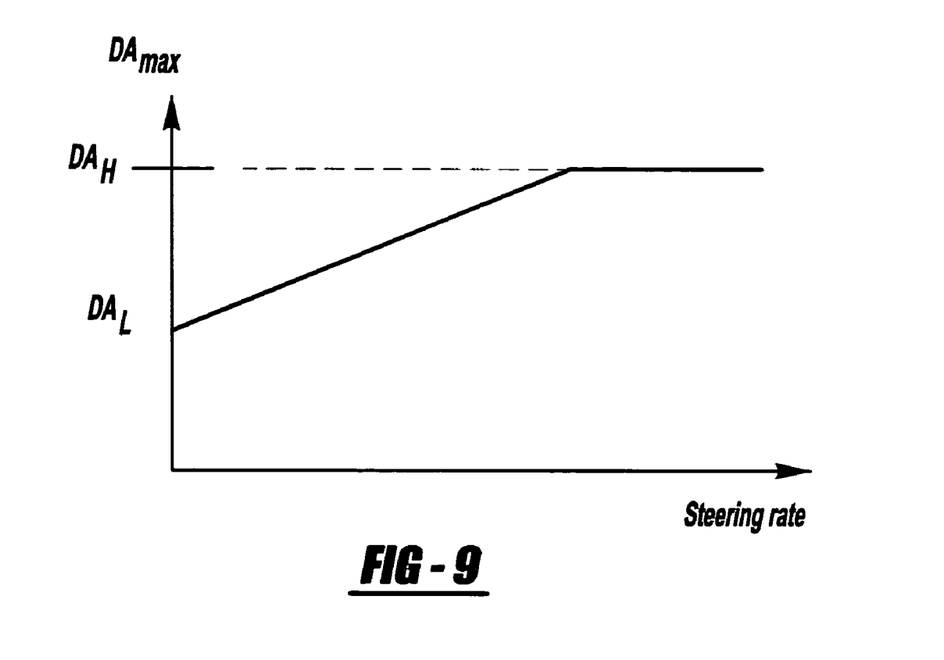
FIG. 9 is a graph with steering rate on the horizontal axis and maximum DA command on the vertical axis for determining the maximum DA command based on the steering rate.

FIG. 8 is a flow chart diagram 112 showing the process of determining the AFS dither angle $DA_{AFSD}$ command signal at the box 98, according to an embodiment of the present invention. At box 112, the algorithm fetches the steering rate signal determined at the box 84. The algorithm then determines a maximum AFS dither angle $DA_{MAX}$ command at box 114 based on the steering rate signal. FIG. 9 is a graph with the steering rate on the horizontal axis and the maximum $DA_{MAX}$ command on the vertical axis showing that the maximum $DA_{MAX}$ command increases as the steering rate signal increases up to a certain point. Particularly, if the steering rate is small, the maximum amount of dither of the hand-wheel 16 would also be relatively small so that the amount of vibration of the hand-wheel 16 is proportionate to the amount of stability control being provided. The maximum $DA_{MAX}$ command will be between a low $DA_L$ and a high $DA_H$ command.

The algorithm then determines an error index signal at box 116 that represents the difference between the intended vehicle yaw rate and the actual vehicle yaw rate or the desired lateral acceleration and the actual acceleration using the second part of equation (1), as discussed above.

Figure 10:
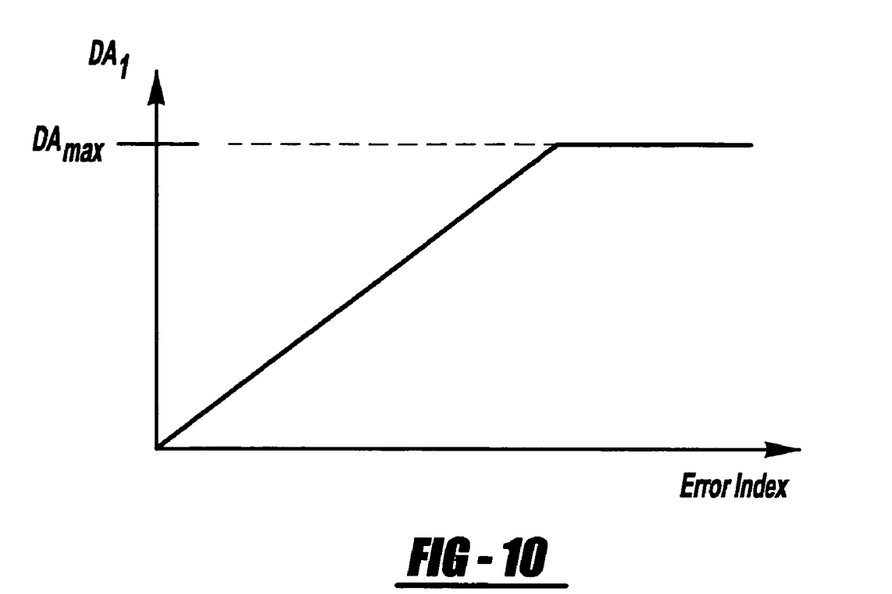
FIG. 10 is a graph with error index on the horizontal axis and DA command on the vertical axis for determining a DA command based on the error index.

The algorithm then determines a $DA_1$ command based on the error index at box 118. FIG. 10 is a graph with error index on the horizontal axis and the $DA_1$ command on the vertical axis. Depending on what the calculation was for the maximum $DA_{MAX}$ command as discussed above, will determine how high the DA1 command will be. For low error indexes, the $DA_1$ command will be a proportional amount of the maximum $DA_{MAX}$ command so that the amount of dither is again proportionate to the amount of stability control being provided.

Figure 11:
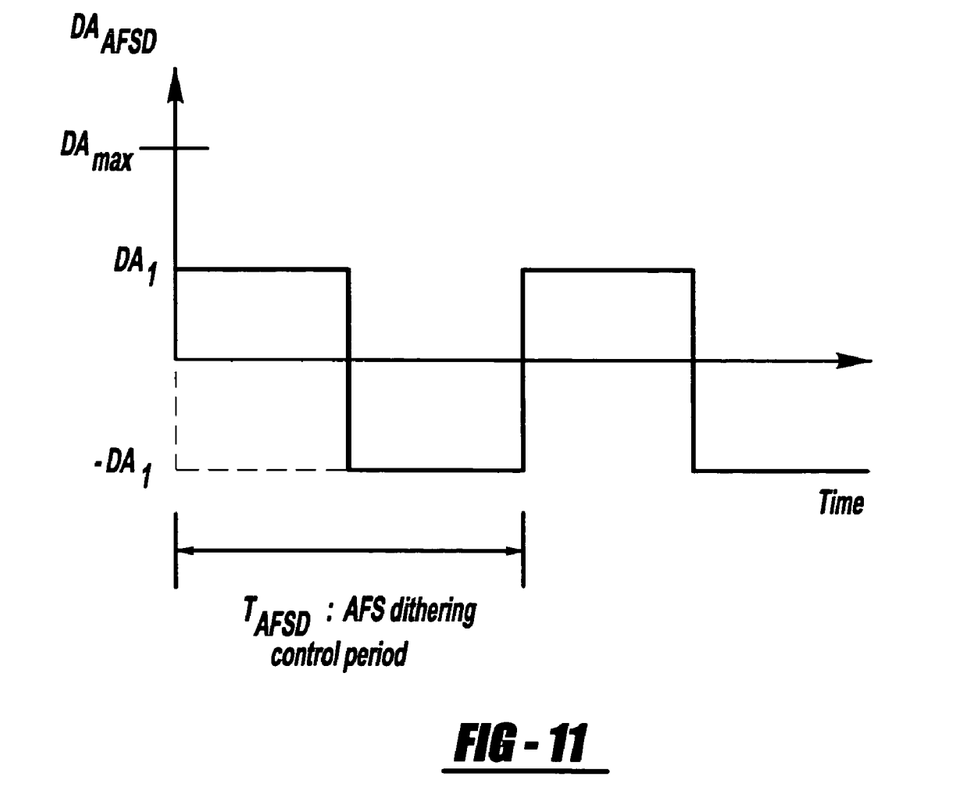
FIG. 11 is a graph with time on the horizontal axis and DA command on the vertical axis showing the AFS dithering control signal.

The $DA_1$ command is an angle amplitude value that is used to determine the vibrational intensity of the AFS dithering. FIG. 11 is a graph with time on the horizontal axis and the $DA_1$ command on the vertical axis showing that the $DA_1$ command is a proportion of the $DA_{MAX}$ command. The $DA_{AFSD}$ command signal is determined at box 120, and is set by the amplitude of the $DA_1$ command and the AFS dithering control period. The amplitude of the $DA_1$ command provides a change in the dithering rate applied to the hand-wheel 16.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for warning a vehicle operator by shaking a vehicle hand-wheel that active vehicle control is being provided to the vehicle, said system comprising:
    an active front steering (AFS) actuator for providing steering angle augmentation for stability control purposes;
    a variable effort steering (VES) actuator for providing steering torque augmentation in turning of the hand-wheel; and
    a controller for causing the AFS actuator to shake the hand-wheel if the active vehicle control is being provided and for causing the VES actuator to apply and release tension to the hand-wheel if the hand-wheel is turned and the active vehicle control is being provided.

2. The system according to claim 1 wherein the controller causes the AFS actuator to increase the shaking of the hand-wheel and increase the rate that the VES actuator applies and releases tension to the hand-wheel as the amount of the stability control increases.

3. The system according to claim 1 wherein the controller determines that the active vehicle control is being provided if a yaw rate error signal is greater than a predetermined threshold or a lateral acceleration error signal is greater than a predetermined threshold.

4. The system according to claim 1 wherein the controller determines a maximum current command for the VES actuator and a maximum angle command for the AFS actuator based on a steering rate signal.

5. The system according to claim 4 wherein the controller determines a current command based on the maximum current command for the VES actuator and an error index value and determines an angle command for the AFS actuator based on the maximum angle command and the error index value.

6. The system according to claim 5 wherein the current command is a proportion of the maximum current command depending on how large the error index value is and the angle command is a proportion of the maximum angle command depending on how large the error index value is.

7. The system according to claim 5 wherein the error index value is calculated by:

$$\text{ErrorIndex} = Cr^* \text{abs}(\Delta r + Kr^* d(\Delta r)/dt) + Cy^* \text{abs}(\Delta y + Ky^* d(\Delta y)/dt)$$

Where $\Delta r$ is a yaw rate error, Kr is a yaw rate error weighting factor, $\Delta y$ is a lateral acceleration error, Ky is a lateral acceleration error weighting factor and Cr and Cy are weighting factors for both the yaw rate error and the lateral acceleration error.

8. The system according to claim 5 wherein the angle command is an amplitude of an AFS dithering signal having a predetermined period for shaking the hand-wheel and the current command is an amplitude of a VES dithering signal having a predetermined period for the amount of tension applied to the hand-wheel.

9. The system according to claim 1 further comprising a device for detecting driver inattention, said controller causing the AFS actuator to shake the hand-wheel if the controller receives a driver inattention signal from the device and causing the VES actuator to apply and release tension to the hand-wheel if the hand-wheel is turned and the controller receives the driver inattention signal from the device.

10. A system for warning a vehicle operator by dithering a vehicle hand-wheel that active vehicle control is being provided to the vehicle, said system comprising:
    an active front steering (AFS) actuator for providing steering angle augmentation for stability control purposes; and
    a controller for causing the AFS actuator to dither the hand-wheel if the active vehicle control is being provided, said controller increasing and decreasing the dithering provided by the AFS actuator based on the amount of active control being provided.

11. The system according to claim 10 wherein the controller determines that the active vehicle control is being provided if a yaw rate error signal is greater than a predetermined threshold or a lateral acceleration error signal is greater than a predetermined threshold.

12. The system according to claim 10 wherein the controller determines a maximum angle command for the AFS actuator based on a steering rate signal.

13. The system according to claim 12 wherein the controller determines an angle command for the AFS actuator based on the maximum angle command and an error index value.

14. The system according to claim 13 wherein the angle command is a proportion of the maximum angle command depending on how large the error index value is.

15. The system according to claim 13 wherein the angle command is an amplitude of an AFS dithering signal having a predetermined period for dithering the hand-wheel.

16. The system according to claim 1 further comprising a device for detecting driver inattention, said controller causing the AFS actuator to shake the hand-wheel if the controller receives a driver inattention signal from the device.

17. A system for warning a vehicle operator by dithering a vehicle hand-wheel that active vehicle control is being provided to the vehicle, said system comprising:
    a variable effort steering (VES) actuator for providing steering torque augmentation in turning of the hand-wheel; and
    a controller for causing the VES actuator to dither the hand-wheel if the active vehicle control is being provided, said controller increasing and decreasing the dithering provided by the VES actuator based on the amount of active control being provided.

18. The system according to claim 17 wherein the controller determines that the active vehicle control is being provided if a yaw rate error signal is greater than a predetermined threshold or a lateral acceleration error signal is greater than a predetermined threshold.

19. The system according to claim 17 wherein the controller determines a maximum current command for the VES actuator based on a steering rate signal.

20. The system according to claim 19 wherein the controller determines a current command for the VES actuator based on the maximum current command and an error index value.

21. The system according to claim 20 wherein the current command is a proportion of the maximum current command depending on how large the error index value is.

22. The system according to claim 20 wherein the current command is an amplitude of a VES dithering signal having a predetermined period for dithering the hand-wheel.

23. The system according to claim 17 further comprising a device for detecting driver inattention, said controller causing the VES actuator to apply and release tension to the hand-wheel if the hand-wheel is turned and the controller receives the driver inattention signal from the device.

24. The system according to claim 1 wherein the active vehicle control includes providing vehicle stability control that causes the vehicle to operate in an intended manner.

* * * * *